(12) United States Patent
Choukroun et al.

(10) Patent No.: US 7,376,429 B2
(45) Date of Patent: May 20, 2008

(54) LOCATING METHOD AND SYSTEM

(75) Inventors: David Choukroun, Le Chesnay (FR); Sarah Boumendil, Paris (FR)

(73) Assignee: Alcatel Lucent, Paris (FR)

( * ) Notice: Subject to any disclaimer, the term of this patent is extended or adjusted under 35 U.S.C. 154(b) by 202 days.

(21) Appl. No.: 10/948,910

(22) Filed: Sep. 24, 2004

(65) Prior Publication Data
US 2005/0070311 A1  Mar. 31, 2005

(30) Foreign Application Priority Data
Sep. 25, 2003  (FR)  ................................. 03 11237

(51) Int. Cl.
*H04Q 7/22* (2006.01)
(52) U.S. Cl. .............................. 455/456.1; 455/562.1; 455/414.2
(58) Field of Classification Search ............ 455/456.1, 455/456.5, 456.2, 517, 562.1, 414.2, 561; 342/118, 126, 146
See application file for complete search history.

(56) References Cited

U.S. PATENT DOCUMENTS

| | | | |
|---|---|---|---|
| 5,924,034 A * | 7/1999 | Dupuy ........................ | 455/440 |
| 6,236,849 B1 | 5/2001 | Reudink et al. | |
| 6,684,071 B1 * | 1/2004 | Molnar et al. .............. | 455/429 |
| 6,774,842 B2 * | 8/2004 | Syrjarinne .............. | 342/357.13 |
| 6,950,664 B2 * | 9/2005 | Chen et al. .............. | 455/456.5 |
| 2002/0128019 A1 | 9/2002 | Ben-Yair et al. | |
| 2003/0119524 A1 * | 6/2003 | Carlsson ...................... | 455/456 |
| 2003/0139188 A1 | 7/2003 | Chen et al. | |
| 2004/0152491 A1 * | 8/2004 | Lobinger et al. ........... | 455/561 |
| 2004/0203863 A1 * | 10/2004 | Huomo ..................... | 455/456.1 |
| 2004/0203880 A1 * | 10/2004 | Riley ....................... | 455/456.1 |
| 2005/0014533 A1 * | 1/2005 | Cave et al. ............... | 455/562.1 |

FOREIGN PATENT DOCUMENTS

EP  1 018 850  7/2000

OTHER PUBLICATIONS

3GPP, "Universal Mobile Telecommunications System (UMTS); Physical layer—Measurements (FDD)," 3G TS 25.215 version 3.1.1 Release 1999, Jan. 2000, 21 pgs.
3GPP, "Universal Mobile Telecommunications System (UMTS); Physical layer; Measurements (FDD)," 3GPP TS 25.215 version 5.4.0 Release 5, Jun. 2003, 20 pgs.

(Continued)

*Primary Examiner*—William Trost
*Assistant Examiner*—Julio Perez
(74) *Attorney, Agent, or Firm*—Sughrue Mion, PLLC

(57) ABSTRACT

The method makes it possible to locate a radio terminal able to communicate with a plurality of radio base stations associated with respective cells under the supervision of at least one radio network controller receiving data intended for locating the terminal, at least one of the cells comprising predetermined cell portions. The base station associated with this cell comprises means for estimating a cell portion where the radio terminal is situated and for focussing signals for communications with the radio terminal selectively in this estimated radio cell portion. The method comprises steps of transmitting from the base station associated with the cell to the radio network controller at least one parameter intended for the locating of the terminal and relating to the estimated cell portion, and locating the radio terminal as a function of at least this parameter relating to the estimated cell portion.

6 Claims, 2 Drawing Sheets

OTHER PUBLICATIONS

3GPP, "Universal Mobile Telecommunications System (UMTS); Radio Interface Protocol Architecture)," 3G TS 25.301 version 3.4.0 Release 1999, Mar. 2000, 47 pgs.

3GPP, "Universal Mobile Telecommunications System (UMTS); Stage 2 functional specification of UE positioning in UTRAN," 3GPP TS 25.305 version 3.8.0 Release 1999, Mar. 2002, 49 pgs.

3GPP, "Universal Mobile Telecommunications System (UMTS); RRC Protocol Specification," 3GPP TS 25.331 version 4.1.0 Release 4, Jun. 2001, 813 pgs.

3GPP, "Universal Mobile Telecommunications System (UMTS); UTRAN Overall Description," 3G TS 25.401 version 3.1.0 Release 1999, Jan. 2000, 35 pgs.

3GPP, "Universal Mobile Telecommunications System (UMTS); UTRAN Iub Interface NBAP Signalling," 3GPP TS 25.433 version 4.1.0 Release 4, Jun. 2001, 565 pgs.

3GPP, "Digital cellular telecommunications system (Phase 2+); Radio subsystem link control," 3GPP TS 45.008 version 5.10.0 Release 5, Apr. 2003, 108 pgs.

3GPP, "Technical Specification Group Radio Access Network; Physical layer—Measurements (FDD)," 3G TS 25.215 version 3.0.0, Oct. 1999, 19 pgs.

Thierry Lucidarme, "Principes de Radiocommunication de Troisieme Generation," Vuibert, 2002, title page and table of contents (7 pages) and pp. 174-177.

* cited by examiner

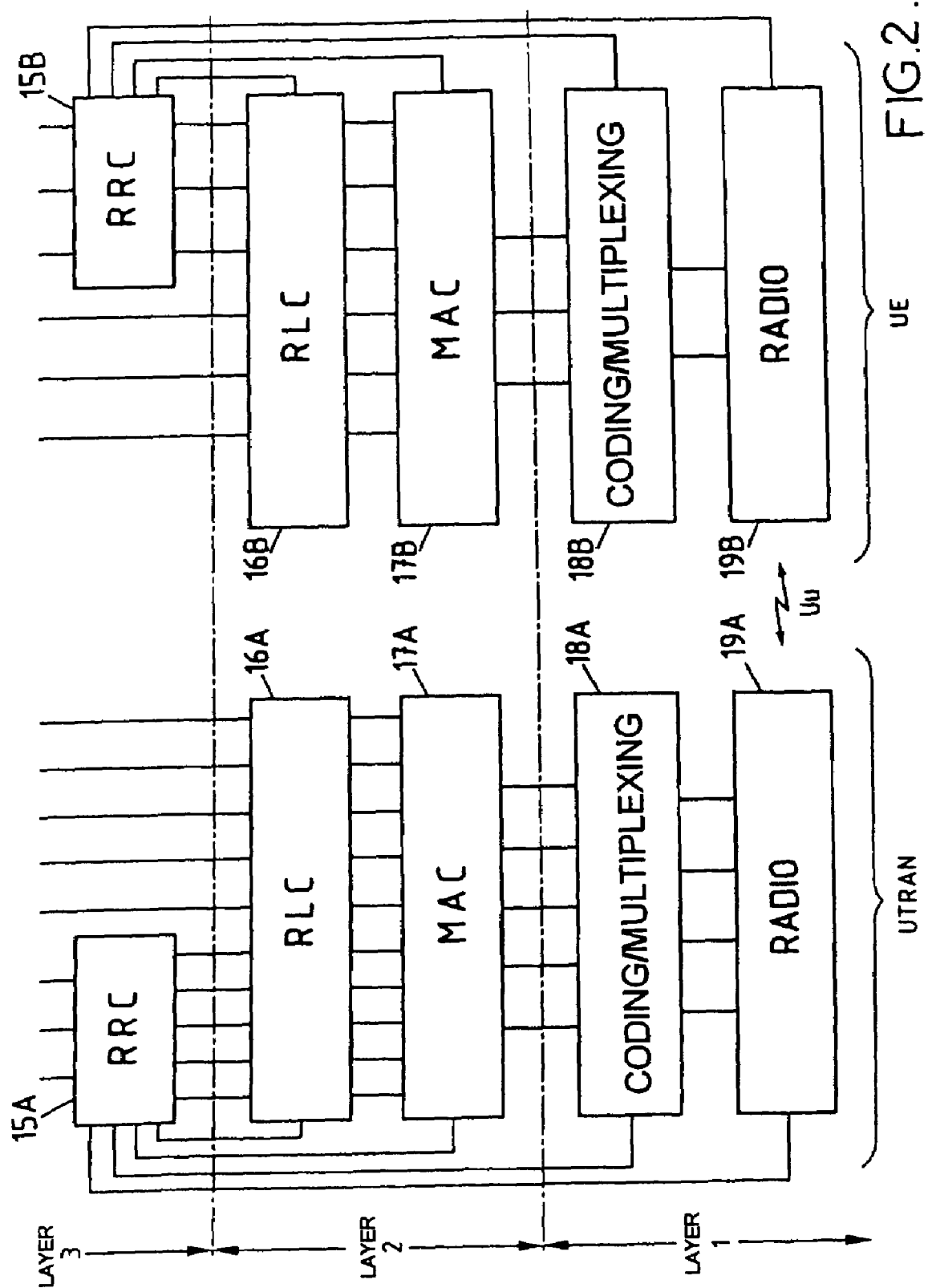

LOCATING METHOD AND SYSTEM

The present invention relates to the field of radiocommunications with mobile terminals and more particularly the field of the locating of mobile terminals.

The invention applies in particular, but not exclusively, to third-generation cellular systems of UMTS ("Universal Mobile Telecommunications Systems") type.

The function of locating the mobile terminals of a radiocommunication system is used at the application package level of the OSI reference model and calls upon the lower layers of the same model, in particular layer 1 (physical link). It consists in estimating the geographical position of a given mobile terminal, in particular on the basis of the signals that this mobile terminal exchanges over the air interface with the radiocommunication infrastructure.

The infrastructure of a radiocommunication network comprises base stations distributed over the region of coverage for communicating with mobile terminals situated in the radio cells or zones, that they service.

In a third-generation system such as UMTS, communication between one or more of these base stations and a mobile terminal is effected under the supervision of at least one radio network controller (RNC) servicing the terminal, the so-called "Serving RNC" or SRNC. The SRNC can cooperate with other RNCs to do this. Exchanges may moreover take place between an RNC and the mobile terminal or an RNC and a base station.

The RNC receives various data originating from the network, in particular from the base stations and from the terminal. These data include measurements relating to transmission signals received by these entities: measurements of signal power serving for the cell selection or handover procedures, time measurements serving for the radio interface synchronization procedures, such as RTT ("Round Trip Time") performed by a mobile terminal or a base station, or RTD ("Real Time Difference") performed by a base station (see technical specification 3G TS 25.215, v3.0.0 and specification 3GPP 45.008 V.5.10.0, published respectively in June 2000 and April 2003 by the 3GPP organization ("Third Generation Partnership Project")).

The locating of a mobile terminal is effected in particular on the basis of these data dispatched to the RNC by the various elements of the network, and on the basis of external complementary elements of varied nature, originating, for example, from a database of geographical references or other information sources.

There are various locating strategies, of which some, such as the cell identifier ("Cell ID") method, the OTDOA ("Observed Time Difference Of Arrival") method or the method of locating based on the GPS system ("Global Positioning System"), are in particular described in technical specification 3G TS 25.305, "Stage 2 functional specification of UE positioning in UTRAN" version 3.8.0 published in March 2002 by the 3GPP, as well as in the reference work "Principes de radiocommunication de troisieme generation" [Principles of third-generation radiocommunication] by M. Lucidarme, published by Vuibert, 2002.

The accuracy of the locating performed depends on a certain number of factors, among which are the method of locating used, the position of the mobile terminal in the zone of coverage and the activity of the mobile terminal.

Specifically, the various aforesaid locating strategies do not offer the same performance and meet different requirements. The methods based on the cell identifier involve the determination of the base station servicing a given mobile terminal, whose geographical coverage provides a first approximation of the location of the station. These methods, advantageous in their simplicity, obviously lack precision for certain applications.

The GPS method is usable only with mobile terminals equipped with receivers capable of receiving GPS signals. Its practical implementation moreover requires the provision by the network infrastructure to the mobile terminal equipped with a GPS receiver of specific data, so-called GPS assistance data, so as to substantially improve the performance of the GPS receiver carried on board the mobile terminal.

The locating methods of TOA ("Time of Arrival") or TDOA type involve a measurement of the time of arrival of the signals received. The presence of propagation multipaths limits the precision with which the time of arrival of the first component of a signal received may be estimated. This considerably influences the performance of the entities whose job is to calculate the location of the mobile stations in the network, and forces a compromise between precision of service and processing time.

Furthermore, the results of several locating methods may be combined to sharpen the location fix.

The locating information may be required by various entities for many reasons, for example by the network itself or else by third parties so as to deliver certain services, by the mobile terminal or by an emergency call service.

An increase in precision in the locating operations gives rise to an increase in the associated costs, this increase being related to the additional operations for measurement and calculation.

Certain base stations, in particular in the UMTS type networks, are equipped with configurable antenna devices, adapted for transmitting according to various antenna patterns. Each antenna pattern selectively covers a predefined portion of a radio cell associated with such a base station. The configuration of such an antenna device is effected as a function of commands that are transmitted to it by pilot elements in the base station.

These capabilities of adaptation of such base stations are in particular used when they set up a communication channel with a terminal, in order to focus the radiation of the antennas—and hence the transmission of signals over the communication channel—in the portion estimated to be most adapted to this transmission. This operation is dubbed "beamforming". Its definition takes place during the setting up of the communication channel between the base station and the mobile terminal at the level of layer 1 of the OSI reference model.

An aim of the present invention is to make it possible to improve, without implementing expensive means, the locating of a radio terminal in a radiocommunication network whose base stations use "beamforming" techniques.

The invention thus proposes, according to a first subject, a method of locating a radio terminal able to communicate with a plurality of radio base stations associated with respective cells under the supervision of at least one radio network controller receiving data intended for locating the terminal, at least one of the cells comprising predetermined cell portions, the base station associated with the said cell comprising means for estimating a cell portion where the radio terminal is situated and for focussing signals for communication with the radio terminal selectively in the said estimated radio cell portion.

According to the invention, the method comprises the following steps:

transmitting from the base station associated with the said cell to the radio network controller at least one parameter intended for the locating of the terminal and relating to the estimated cell portion, and locating the radio terminal as a function of at least the said parameter relating to the estimated cell portion.

This method makes it possible to advantageously exploit, in the location estimations carried out at the application package level of the network, operations carried out at the level of the bottom layers of the network to implement radiocommunications links.

According to a second subject, the invention proposes a system of locating a radio terminal able to communicate with a plurality of radio base stations associated with respective cells under the supervision of at least one radio network controller receiving data intended for locating the terminal, at least one of the cells comprising predetermined cell portions, the base station associated with the said cell comprising means for estimating a cell portion where the radio terminal is situated and for focussing signals for communications with the radio terminal selectively in the said estimated radio cell portion. According to the invention, this system comprises means for locating the radio terminal as a function of at least one parameter relating to the estimated cell portion, the said parameter being transmitted from the base station associated with the said cell to the radio network controller.

Other features and advantages of the present invention will become apparent in the following description of non-limiting exemplary embodiments, with reference to the appended drawings, in which:

FIG. 2 is a schematic showing the layered organization of communication protocols employed on the radio interface of the UMTS network.

Figure 1:
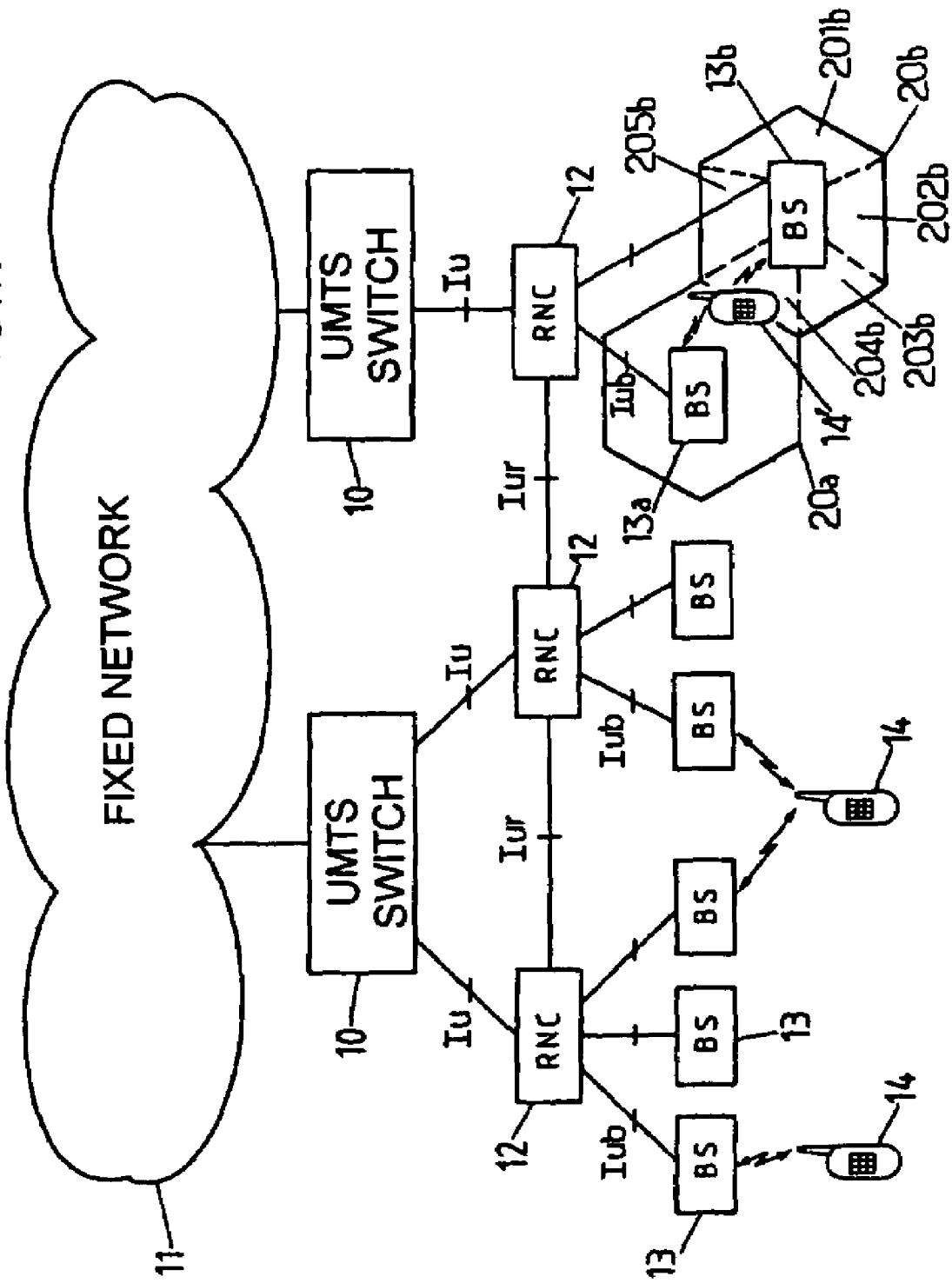
FIG. 1 is a diagram of a UMTS network in which the present invention is implemented.

The invention is described below in its application to a UMTS network, with reference to FIG. 1.

The mobile service switches 10, belonging to a Core Network (CN), are linked to one or more fixed networks 11 and, by means of an interface called Iu, to radio network controllers 12, or RNCs. Each RNC 12 is linked to one or more base stations 13, also called "node B", by means of an interface called Iub. The base stations 13, distributed over the network coverage region, can communicate by radio with mobile terminals 14, 14' called UEs (User Equipment). Some RNCs 12 can additionally communicate with each other by means of an interface called Iur. The RNCs and the base stations form an access network called UTRAN (UMTS Terrestrial Radio Access Network).

In a UMTS network, fixed-frequency spread spectrum orthogonal codes are allocated to each channel. To each base station 13 there corresponds at least one cell, each cell then corresponding to a sector of the region of coverage. A distinction is made between the downlinks for the communication channels from the access network to the terminals and the uplinks for the communication channels from the terminals to the access network. On each downlink, a distinct scrambling code makes it possible to distinguish a cell, a distinct orthogonal variable spreading code (OVSF) makes it possible to distinguish each service in a cell. On each uplink, a distinct scrambling code makes it possible to distinguish a mobile, a distinct OVSF code makes it possible to distinguish each service within a mobile. Different sets of codes are allocated to neighbouring cells so as to minimize the external interference between cells. For a given fixed frequency, the quantity of possible channels is limited by the number of available codes.

The UTRAN includes elements from layers 1 and 2 of the ISO model in order to provide the links required on the radio interface (called Uu), and a Radio Resource Control (RRC) stage 15A belonging to layer 3, as described in the technical specification 3G TS 25.301, "Radio Interface Protocol", version 3.4.0 published in March 2000 by the 3GPP. Viewed from the upper layers, the UTRAN acts simply as a relay between the UE and the CN.

FIG. 2 shows the RRC stages 15A, 15B and the stages of the lower layers that belong to the UTRAN and to a UE. On each side, layer 2 is subdivided into a Radio Link Control (RLC) stage 16A, 16B and a Medium Access Control (MAC) stage 17A, 17B. Layer 1 includes a coding and multiplexing stage 18A, 18B. A radio stage 19A, 19B provides for the transmission of radio signals based on symbol trains supplied by stage 18A, 18B, and provides for the reception of signals in the other direction.

There are various ways of adapting the protocol architecture according to FIG. 2 to the UTRAN hardware architecture according to FIG. 1, and in general various structures can be adopted according to the channel types (see section 11.2 of the technical specification 3G TS 25.401, "UTRAN Overall Description", version 3.1.0 published in January 2000 by the 3GPP). The RRC, RLC and MAC stages are in the RNC 12. Layer 1 is for example in the Node B 13. Part of this layer may however be in the RNC 12.

When several RNCs are involved in a communication with a UE, there is generally one Serving RNC (SRNC), in which the layer-2-based modules (RLC and MAC) are located, and at least one Drift RNC (DRNC) to which a base station 13 is linked, and with which base station the UE is in radiocommunication. Suitable protocols provide the exchanges between these RNCs over the Iur interface, for example ATM (Asynchronous Transfer Mode) and AAL2 (ATM Adaptation Layer No. 2). These same protocols may also be employed on the Iub interface for the exchanges between a node B and its RNC.

Layers 1 and 2 are each controlled by the RRC sub-layer, the characteristics of which are described in the technical specification TS 25.331, "RRC Protocol Specification", version 4.1.0 published in June 2001 by the 3GPP. The RRC stage 15A, 15B supervises the radio interface. It additionally handles flows to be transmitted to the remote station according to a "control plan", as opposed to the "user plan" which corresponds to the handling of user data coming from layer 3.

An active UE sustains with its SRNC an "RRC connection", according to which it can exchange various signalling information. The management of this RRC connection is described in section 8.1 of the aforesaid specification TS 25.331. Section 8.3 describes the mobility procedures involved within the context of this RRC connection, in particular the way in which the RNC can update in respect of the UE an active set of cells with which there is a radio link. The "radio link" is understood here as the logical association between the UE and a cell. Such a link can support transmissions according to one or more physical channels. For each UE with which there is an RRC connection, the RNC knows the radio link or links in force.

It is via this RRC connection that the SNRC is capable of receiving the measurements made by the UE on the radio interface (powers received, time measurements, etc). In this regard reference may be made to section 8.4 of the specification TS 25.331 (MEASUREMENT CONTROL and MEASUREMENT REPORT messages).

It is known to utilize these measurements at the RNC with a view to locating the terminal, for example on the basis of the identity of the cell that provides the best radio link, possibly with complementary distance information deduced from the time measurements.

In certain cases these measurements may be supplemented with other measurements made by the nodes B and obtained by the RNC by means of the procedures of the NBAP protocol implemented on the Iub interface ("Node B Application Protocol" see section 8.3.1 of the technical specification 3G TS 25.433, version 4.1.0, "UTRAN Iub Interface NBAP Signalling", published in June 2001 by the 3GPP).

The base stations 13 can each serve one or more cells by means of respective transmitters/receivers associated with respective antennas.

Each base station 13 forms in a cell that it services a set of downlink physical channels by the CDMA technique.

With reference again to FIG. 1, only two radio cells 20a and 20b are represented. Generally, the radio cells are represented diagrammatically in hexagonal form which can in fact vary as a function of the typology of the terrain. Likewise the boundary between zones is in reality less marked than in the figure, the zones being able to overlap so as to pass progressively from one zone to another.

Within each radio cell 20a, 20b serviced by a base station 13, respectively 13b, is disposed an antenna devised to transmit and receive signals exchanged with mobile terminals situated in the zone serviced by the base station 13.

The base station 13b servicing the radio cell 20b is equipped with an antenna system allowing it to implement the technique of beamforming according to 5 portions of cells 201b, 202b, 203b, 204b and 205b.

During the setting up of a new link, under the supervision of its RNC 12, by the base station servicing the radio cell, as indicated hereinabove, at the level of layer 1 of the OSI model, the radio cell 20b will focus the signals exchanged in the cell portion, for example 204b, estimated as most adapted to the exchanges with a targeted terminal 14', with the aid of its configurable antenna device.

Moreover, a feature of spread spectrum CDMA systems is the ability to support a macrodiversity mode. Macrodiversity consists in making provision for a mobile terminal to be able to communicate simultaneously with distinct fixed transmitters/receivers in an active set. In the downgoing direction, the mobile terminal receives the same information several times. In the upgoing direction, the radio signal transmitted by the mobile terminal is picked up by the fixed transmitters/receivers of the active set to form different estimates that are then combined in the network.

Macrodiversity affords a gain in reception which improves the performance of the system by virtue of the combination of different observations of one and the same item of information.

It also makes it possible to carry out soft intercell transfers (soft HO, "soft handover"), when the mobile terminal is moving.

When a terminal is at the boundary of two (or more) radio cells and is in a state of effecting a "soft handover" from one cell to another, it is furnished with the codes necessary to listen to several base stations, each base station being furnished with the codes for listening to the terminal. The RNC manages by means of known techniques the downlinks to the terminal and the uplinks from the terminal, so as to ensure continuity of communication on passing from one zone to another.

A similar mechanism, called softer transit (softer HO, "softer handover"), exists when the transition is made between two cells associated with one and the same base station in the case of a multisector antenna, each cell then corresponding to a sector of the antenna.

Typically the locating of a radio terminal in a UMTS type network comprises two main steps: firstly, the carrying out of signal measurements relating to the terminal, for example the terminal 14', to be located, then a calculation of an estimation of position of the terminal on the basis of these measurements.

In the locating method based on the cell identifier, locating is performed on the basis of the determination of the identification of the cell providing radio coverage to the terminal to be located (see Technical Specification 3GPP TS 25.305 version 3.8.—Universal Mobile Telecommunications System (UMTS); Stage 2 functional specification of UE positioning in UTRAN § 8). Thus when a location request is made, the RNC firstly verifies the state of the terminal. If the terminal is in a state in which the cell identifier is available (for example the state providing an active connection to the terminal), this identifier is chosen as a basis for the estimation of the positioning. When the cell identifier is not available, the RNC has an exchange established with the terminal so as to establish the cell in which it is situated.

When the terminal is in soft HO mode, localization by the method of the cell identifier is performed as a function of the information relating to all the cells associated with the terminal in soft HO mode, situated in the active set. In the same way the identifier of each cell is determined, then a reference cell identifier is selected as a function of one or more parameters or principles described in §8.1.2.2 of the above-cited technical specification, among which:
  quality of the links established in the respective cells (e.g. cell identifier with the best quality is selected as reference identifier);
  the identifier selected is that of the cell most recently introduced into the active set of the terminal;
  the identifier selected is that of the cell providing an active connection at the moment of localization request.

The principle of determining the identifier of cells is similar for the case of the softer HO mode.

This identification is made on the basis of data dispatched by the base stations of the active set to the RNC.

To raise the locating precision, the locating procedure can also request that additional measurements, supplementary to those routinely requested for the locating method adopted, be carried out by the base station servicing the cell identified and be dispatched to the RNC or else by the terminal itself: measurements of RTT, of signal powers and of signal level.

The determination of location by the method of the identifier of the cell or by any other method is done on the basis of data dispatched by the base station 13b to its RNC 12 on request from the latter, via the Iub link, generally uploaded in the "Measurements Report" messages. These data are for example of the type defined in technical specification 3GPP TS 25.215 version 5.4.0 (UMTS; Physical Layer; Measurements (FDD)) such as measurements of powers and of signal level per cell: received total band power, or the transmitted carrier power, or else the signal-to-interferer ratio (SIR).

An implementation of the invention consists in that when a base station, for example the station 13b in the case represented in FIG. 1, is equipped with a beamforming device, it dispatches in its messages to the RNC intended for locating the terminal 14' information relating to the cell portion estimated by the base station 13b in which the communications signals are focussed. This information may, for example, be one or more of the following data: identifier of the estimated cell portion 204b, power or time measurements performed in relation to this portion. It may, for example, be relayed to the RNC in the "Dedicated Measurement Report" messages of the NBAP profile.

Thus, at least some data dispatched by a station equipped with a beamforming device to the RNC for the locating of a terminal for which the base station has estimated a cell portion will relate to the estimated cell portion.

In particular, the measurements of the received total band power of transmitted carrier power or of signal-to-interferers ratio (SIR) or any other type of measurements required by the RNC from a base station and performed for the estimated cell portion will be dispatched to the RNC to serve subsequently for locating.

When the terminal is in soft HO mode, localization will thus be performed on the basis of the set of measurements relating to the respective estimated cell portions for the base stations of the active set furnished with beamforming means, and to the cells for the base stations of the active set not furnished with such means.

For example, if the terminal 14' is situated at the boundary between the cells 20a and the portion 204b, the base station 13a will dispatch data relating to the cell 20a to the RNC, whereas the base station 13b will dispatch data relating to the cell portion 204b.

The combination of several locating methods according to the prior art may lead to the determination of more than one locating zone in respect of a given terminal. For example, the combination of a method of TOA type using the measurement carried out by a base station of the time elapsing between the dispatching of a signal to a terminal situated in the cell that it services and its return (RTD), which provides a circle as the locating result, and of a method of a type which provides a hyperbola, may lead to having two possible positions for the targeted terminal, corresponding to two intersections between the circle and the hyperbola. The information relating to a cell portion may be used in the locating process in addition to these two methods and can make it possible to determine which of these two possible locations ought to be adopted, should the two intersections not lie in the same portion.

A method according to the invention can therefore be implemented in all the desired locating methods. It makes it possible to increase the precision of the location fix without requiring expensive means.

The invention claimed is:

1. Method of locating a radio terminal able to communicate with a plurality of radio base stations associated with respective cells under the supervision of at least one radio network controller receiving data intended for locating the terminal, at least one of the cells comprising predetermined cell portions, the base station associated with the said at least one of the cells comprising means for estimating a cell portion where the radio terminal is situated and for focusing signals for communications with the radio terminal selectively in the estimated radio cell portion, comprising the steps of:

transmitting from the base station associated with the said at least one of the cells to the radio network controller at least one parameter intended for the locating of the terminal and relating to the estimated cell portion, and locating the radio terminal as a function of at least the said parameter relating to the estimated cell portion.

2. Method of locating according to claim 1, in which the parameter transmitted by the said at least one of the cells is an identifier of the said estimated cell portion.

3. Method of locating according to claim 1 according to which the parameter transmitted by the said at least one of the cells is a value representative of a measurement of signal power relating to the said estimated cell portion.

4. System of locating a radio terminal able to communicate with a plurality of radio base stations associated with respective cells under the supervision of at least one radio network controller receiving data intended for locating the radio terminal, at least one of the cells comprising predetermined cell portions, the base station associated with the said at least one of the cells comprising means for estimating a cell portion where the radio terminal is situated and for focusing signals for communications with the radio terminal selectively in the estimated radio cell portion, comprising means for locating the radio terminal as a function of at least one parameter relating to the estimated cell portion, the said parameter being transmitted from the base station associated with the said cell to the radio network controller.

5. System of locating according to claim 4, in which the parameter transmitted by the said at least one of the cells is an identifier of the said estimated cell portion.

6. System of locating according to claim 4 according to which a parameter transmitted by the said at least one of the cells is a value representative of a measurement of signal power relating to the said estimated cell portion.

* * * * *